United States Patent
DeGrange, Jr.

(10) Patent No.: US 7,242,863 B2
(45) Date of Patent: Jul. 10, 2007

(54) METHOD AND SYSTEM FOR COORDINATING AND UTILIZING CHANNEL POWER INFORMATION IN AN OPTICAL COMMUNICATIONS NETWORK

(75) Inventor: James E. DeGrange, Jr., Glen Burnie, MD (US)

(73) Assignee: Ciena Corporation, Linthicum, MD (US)

( * ) Notice: Subject to any disclaimer, the term of this patent is extended or adjusted under 35 U.S.C. 154(b) by 848 days.

(21) Appl. No.: 10/062,139

(22) Filed: Feb. 1, 2002

(65) Prior Publication Data

US 2003/0035170 A1    Feb. 20, 2003

Related U.S. Application Data

(60) Provisional application No. 60/289,672, filed on May 9, 2001.

(51) Int. Cl.
*H04B 10/08* (2006.01)

(52) U.S. Cl. .................... 398/30; 398/32; 398/33; 398/94

(58) Field of Classification Search ........... 398/30–33, 398/94–95, 195–197
See application file for complete search history.

(56) References Cited

U.S. PATENT DOCUMENTS

| | | | | |
|---|---|---|---|---|
| 5,117,303 A | | 5/1992 | Desurvire et al. .......... 359/341 |
| 5,225,922 A | | 7/1993 | Chraplyvy et al. ......... 359/124 |
| 5,357,257 A | | 10/1994 | Nevin ........................ 342/165 |
| 5,651,090 A | | 7/1997 | Moriya et al. ............. 395/2.31 |
| 5,677,781 A | | 10/1997 | Mori et al. ................. 359/179 |
| 5,857,143 A | | 1/1999 | Kataoka ....................... 455/62 |
| 5,894,362 A | | 4/1999 | Onaka et al. ............... 359/124 |
| 5,917,649 A | | 6/1999 | Mori et al. ................. 359/341 |
| 5,963,361 A | | 10/1999 | Taylor et al. .............. 359/337 |
| 5,978,115 A | * | 11/1999 | Condict et al. .............. 398/79 |
| 6,031,647 A | * | 2/2000 | Roberts ....................... 398/94 |
| 6,040,933 A | * | 3/2000 | Khaleghi et al. ............. 398/1 |
| 6,072,601 A | | 6/2000 | Toyohara .................... 358/484 |
| 6,137,605 A | | 10/2000 | Watanabe ................... 359/124 |
| 6,151,336 A | * | 11/2000 | Cheng et al. ............... 370/535 |
| 6,198,571 B1 | | 3/2001 | Yang .......................... 359/337 |
| 6,212,311 B1 | | 4/2001 | Tomita ......................... 385/24 |
| 6,219,162 B1 | | 4/2001 | Barnard et al. ............. 359/124 |
| 6,400,479 B1 | | 6/2002 | Zhou et al. ................. 359/134 |
| 6,400,497 B1 | | 6/2002 | Suzuki et al. .......... 359/337.11 |
| 6,701,089 B1 | * | 3/2004 | Goodwin et al. ............. 398/79 |
| 6,735,395 B1 | * | 5/2004 | Bai .............................. 398/95 |

\* cited by examiner

*Primary Examiner*—Dzung Tran
(74) *Attorney, Agent, or Firm*—Clements Wlaker; Christopher L. Bernard; Tyler S. Brown (57) ABSTRACT

A method of coordinating channel power information in a wavelength division multiplexed (WDM) optical communication system is disclosed. The method determines weighting values for each channel of the WDM signal based on channel launch powers. A source data object may used to transmit the channel weights and channel information from network elements having channel sources such as transmitters to downstream network elements. Block data objects may be used to identify channel blocks in the system and are also transmitted downstream. The source and block objects may be correlated to determine which channels are in-view at a particular point in the network and thereby determine which of the channel weights should be used as a basis for managing the network at that point. A WDM system is also disclosed which may actively control channel launch powers and feed the adjusted launch powers into the method of coordinating channel power information.

20 Claims, 9 Drawing Sheets

METHOD AND SYSTEM FOR COORDINATING AND UTILIZING CHANNEL POWER INFORMATION IN AN OPTICAL COMMUNICATIONS NETWORK

CROSS-REFERENCE TO RELATED APPLICATIONS

This application claims the benefit of U.S. provisional application Ser. No. 60/289,672, filed May 9, 2001, and U.S. nonprovisional application Ser. No. 09/917,043, filed on Jul. 27, 2001 the entire contents of which are incorporated herein by reference.

BACKGROUND OF THE INVENTION

1. Field of Invention

The invention relates generally to a method and system for modeling channel power, coordinating channel power information, and utilizing the coordinated channel power information as a basis for managing optical network elements in a multi-channel optical communications system.

2. Description of Related Art

Wavelength division multiplexing (WDM) has been used to increase the capacity of existing fiber optic networks. In a WDM system, plural optical signal channels are carried over a single optical fiber with each channel being assigned a particular wavelength. Such systems typically include a plurality of receivers, each detecting a respective channel by effectively filtering out the remaining channels.

Optical channels in a WDM system are frequently transmitted over silica based optical fibers, which typically have relatively low loss at wavelengths within a range of 1525 nm to 1580 nm. WDM optical signal channels at wavelengths within this low loss "window" can be transmitted over distances of approximately 50 km without significant attenuation. For distances beyond 50 km, however, optical amplifiers are used to compensate for optical fiber loss.

Typically, all of the channels of a WDM system are launched (transmitted or otherwise injected into an optical communications path) with the same power level. The flat power spectrum that results has certain advantages as in known in the art.

The advent of mixed channel plans where channels of different rates, data formats, channel spacings, etc are present in a WDM system has led the inventor to consider launching different channels at different power levels. The invention described in the parent application utilizes the fixed insertion losses present on different signal combining paths to impart a relative power difference between different bands of channels. In other words, one band of channels experiences a different amount of attenuation as it is combined with other bands of channels which may be accomplished by utilizing different optical signal combiners having different insertion losses for different bands of channels.

As discussed in the parent applications referenced above, the channel power values used for amplifier power control may be weighted (e.g. the power value of a channel may be an integer multiple of a defined channel unit power) to account for mixed channel plans. Specifically, the channel powers may be weighted according to the data rate and/or format of the signal. For example, a signal having a transmission rate of 2.5 Gbps may be used as a reference value with a weight of 1 channel unit; a signal having a 10 Gbps transmission rate using forward error correction may be weighted as 2 channel units; and a signal having a 10 Gbps transmission rate without forward error correction may be weighted as 4 channel units.

An optical amplifier according to the parent application could infer channel weighting values simply by knowing basic information about the signal such as data rate and format (e.g. FEC used or not), etc. The inferred channel weights are used to minimize ASE (amplified spontaneous emissions). Such a system, however, lacks granularity and uses fixed, predefined increments of signal attenuation and corresponding channel unit weightings. In other words, the inventor recognized that the basic concept of channel weighting could use refinement and could be extended to control points other than ASE minimization in an amplifier.

BRIEF DESCRIPTION OF THE DRAWINGS

The present invention will become more fully understood from the detailed description given herein below and the accompanying drawings which are given by way of illustration only, and thus are not limitative of the present invention, and wherein.

SUMMARY OF THE INVENTION

An exemplary embodiment of the invention is a method for coordinating channel power information in a wavelength division multiplexed optical communications system having at least a first and a second network element, the method including gathering information on local communications assets local to the first network element including launch path power values and channel information of the wavelength division multiplexed channels output from the first network element; determining channel weighting values for the wavelength division multiplexed channels output from the first network element based on the launch path power values and the channel information; and transmitting the channel weighting values from the first network element to the second network element.

Another exemplary embodiment of the invention is a method for using coordinated channel power information in a network element of a wavelength division multiplexed optical communications system carrying a plurality of channels, the method including: receiving channel weighting values and channel information for wavelength division multiplexed channels generated upstream of the network element; determining a set of in-view channels that are passing through a point in the network element based on the channel information; calculating a reference value according to channel weighting values corresponding to the set of in-view channels; and utilizing the reference value as a basis for managing at least a portion of the network element corresponding to the point though which the in-view channels pass.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

The expression "optically communicates" as used herein refers to any connection, coupling, link or the like by which optical signals carried by one optical system element are imparted to the "communicating" element. Such "optically communicating" devices are not necessarily directly connected to one another and may be separated by intermediate optical components or devices. Likewise, the expressions "connection" and "operative connection" as used herein are relative terms and do not require a direct physical connection.

Figure 1A:
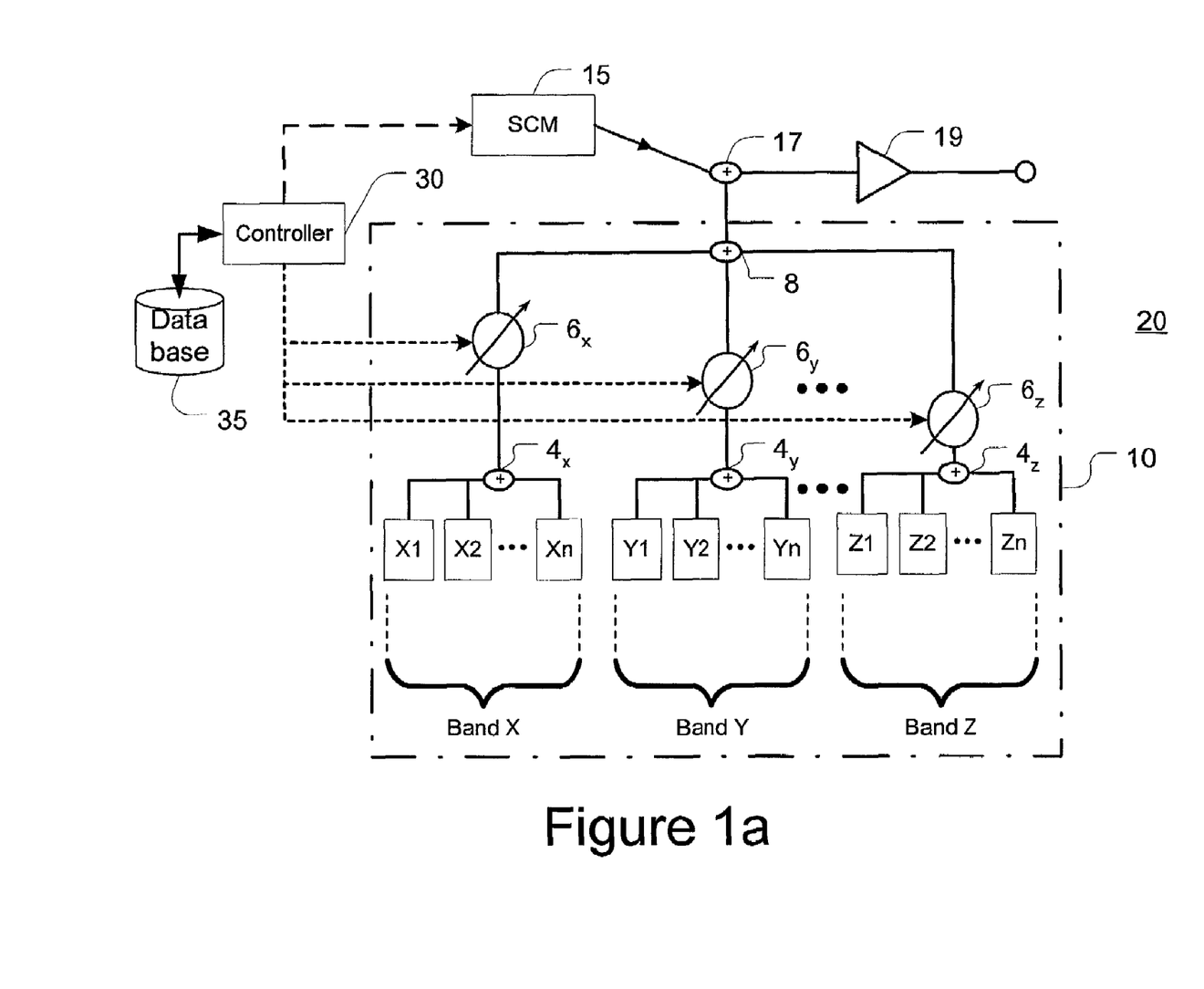
FIG. 1a is a block diagram of WDM transmitter node capable of imparting relative launch powers to bands of channels according to an embodiment of the invention.

FIG. 1a is a block diagram of a wavelength division multiplexed transmitter node 20. The WDM transmitter terminal 20 includes a WDM transmitter 10 operatively connected to a controller 30 and supplying a WDM signal to combiner 17. The combiner 17 may also have an input from the service channel modem (SCM) 15 and combine the optical service channel with the WDM signal from WDM transmitter 10.

The SCM 15 and associated devices and techniques for adding, dropping, routing and otherwise handling service channels is a conventional device. Examples of such conventional SCMs may be found in U.S. Pat. Nos. 5,532,864; 5,798,855; and 6,141,125.

Combiner 17, like combiners 8 and 4 may be constructed from conventional passive optical components which can combine plural wavelengths into a single output. Typical non-limiting examples include fused fiber combiners and dielectric thin film filters. Because such combiners are often used in reverse as a splitter they are often referred to as a splitter or as a splitter/combiner.

An optical amplifier 19 may be used to amplify the combined service channel and WDM signal. While optical amplifier 19 is not strictly necessary it is often useful to impart a large signal strength while launching channels so that they may be accurately detected at a long distance. Optical amplifier 19 is also a conventional element and includes any device that has the ability to increase the signal strength of plural WDM channels without requiring an optical to electrical conversion. Typical non-limiting examples include the EDFA (erbium doped fiber amplifier), EDWA (erbium doped wave guide amplifier), Raman amps, etc.

Significantly and as shown in FIG. 1a, the WDM transmitter 10 includes variable optical attenuators (VOAs) 6 which are situated in the launch path of the WDM channels. The channels are supplied by transmitters (X1, X2, . . . Xn, Y1, Y2, . . . Yn, Z1, Z2, . . . Zn, etc). Each of the transmitters (X1, X2, . . . Xn, Y1, Y2, . . . Yn, Z1, Z2, . . . Zn, etc) may be constructed with conventional elements, as known in the art, such as a laser (e.g. a narrow line-width laser such as a DFB laser) and a modulator (e.g. direct modulation of the laser or an external modulator such as a Mach-Zhender modulator) so as to create an information bearing signal (one of the channels to be multiplexed into a WDM signal). Other conventional elements such as remodulators and wavelength stabilization components may also be included in the transmitter 10 as is known in the art.

The channels being generated by transmitters (X1, X2, . . . Xn, Y1, Y2, . . . Yn, Z1, Z2, . . . Zn, etc) are organized into bands of channels. As shown in FIG. 1a, the channels may be organized into Band X (including channels x1, x2, . . . xn), Band Y (including channels y1, y2, . . . yn), and Band Z (including channels z1, z2, . . . zn). The channels in Band X are combined by combiner 4x, the Band Y channels are combined by combiner 4y, and the channels in Band Z are combined by combiner 4z. Each channel band (X, Y, Z) is then fed to a respective variable optical attenuator 6x, 6y, and 6z. In this way, the channels in each band will be attenuated by the same amount.

The variable optical attenuators 6x, 6y, 6z are conventional elements in and of themselves and have a control input. In the invention, the controller 30 adjusts the attenuation of the VOAs 6x, 6y, and 6z according to a launch path power value. The launch path power values and control are on a per-band basis in FIG. 1a such that all the channels in a particular band have the same launch path power value and such that different bands may have a different launch path power values.

Preferably, all the channels in the same band have a common characteristic such that it is appropriate to attenuate the entire band by the same amount and thereby generate channels having the same launch power.

After being attenuated by the respective attenuators 6x, 6y, 6z the channel bands (X, Y and Z) are further combined by combiner 8. The combiner 17 combines the WDM signal with the service channel from SCM 15.

The number, structure and arrangement of the combiners 4, 8 and 17 may vary from that shown in the figures. For example, it may take more than one stage of combining to combine all the channels in a particular band. Furthermore, the combiners 8 and 17 need not be separate elements. It is generally preferable, however, that the combiner structure utilized is such that no significant difference in attenuation is experienced by the channels from the combiners (e.g. a symmetric combiner structure may be used so that each channel experiences the same number and type of combiners as all the other channels). The reason for the preference is that it is desired to impart a known, controllable launch power on the channels using the VOAs 6x, 6y, 6z. If, for other reasons, a symmetric combiner structure is not desirable or cost-effective, then the different attenuations experienced by different channels or bands may be accounted for in the channel weighting values as further discussed below.

Controller 30 is operatively connected to the control signal input of the VOAs 6x, 6y, and 6z and supplies control signals (launch power settings) thereto. Controller 30 is also operatively connected to a database 35. Controller 30 may be a microprocessor-based controller executing a computer program the functions of which will be described below in detail with reference to the flowcharts. Database 35 may be implemented with a conventional memory device storing the data structures described below.

Figure 1B:
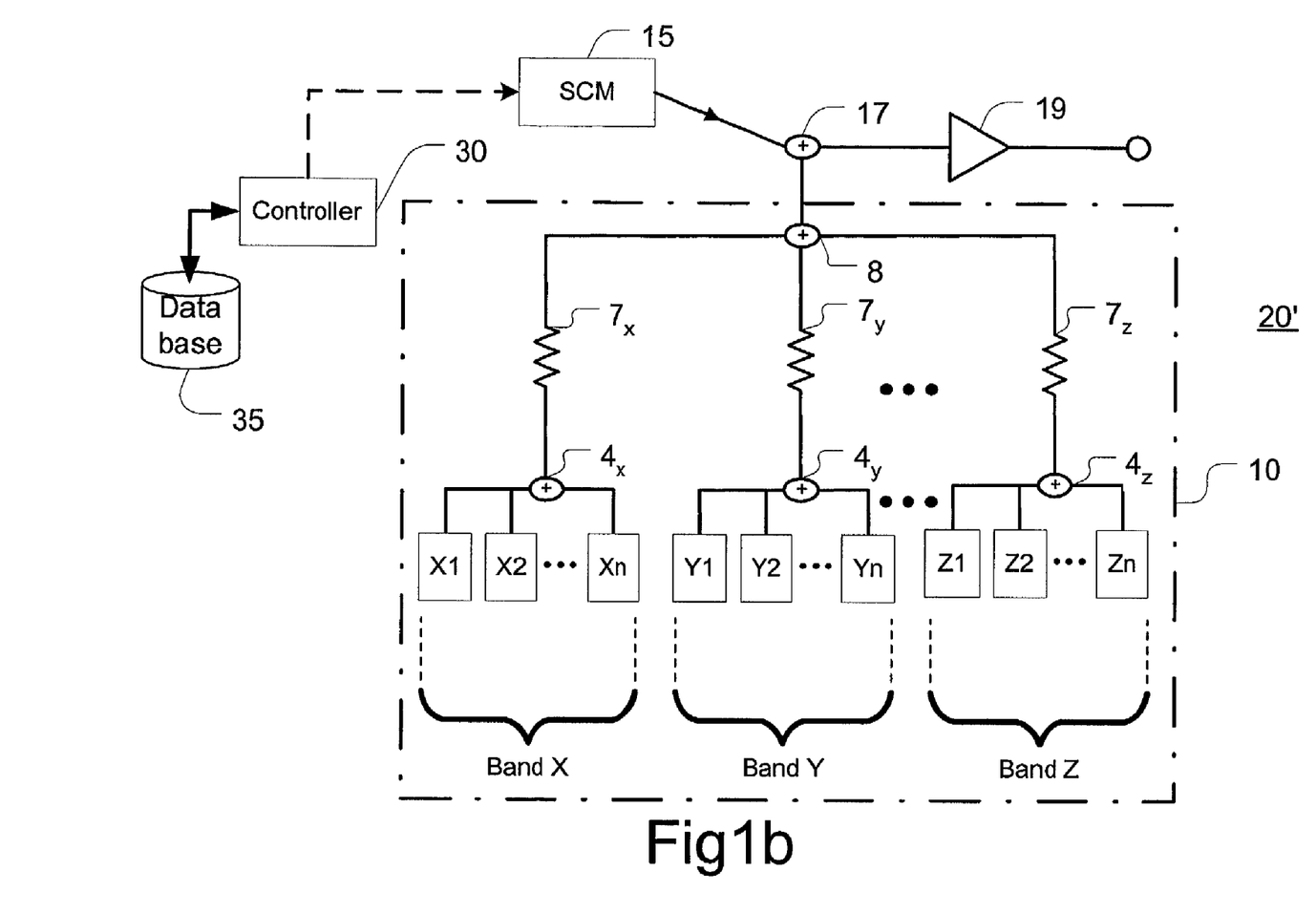
FIG. 1b is a block diagram of WDM transmitter node having fixed attenuation values for bands of channels according to an embodiment of the invention.

FIG. 1b is an alternative transmitter 20' having many similarities with the transmitter 20 shown in FIG. 1a. The main difference is the reliance on fixed attenuators 7 rather than the controllable attenuation provided by the VOAs of FIG. 1a. The fixed attenuators 7 may be a conventional optical attenuator. The fixed attenuators 7 may also represent the fixed insertion losses present on different signal combining paths. For example, the insertion loss experienced by Band X due to combiner 4x may be represented by fixed attenuator 7x and this attenuation 7x may differ from the attenuations 7y and 7z experienced by Bands X and Y. In other words, the channel launch paths of the different bands may have different attenuation which are accounted for by the fixed attenuators 7. Since the invention is concerned with launching channels having different power levels the fixed attenuation values 7x, 7y, 7z should differ in this embodiment to thereby impart different launch powers on the channels.

Figure 1C:
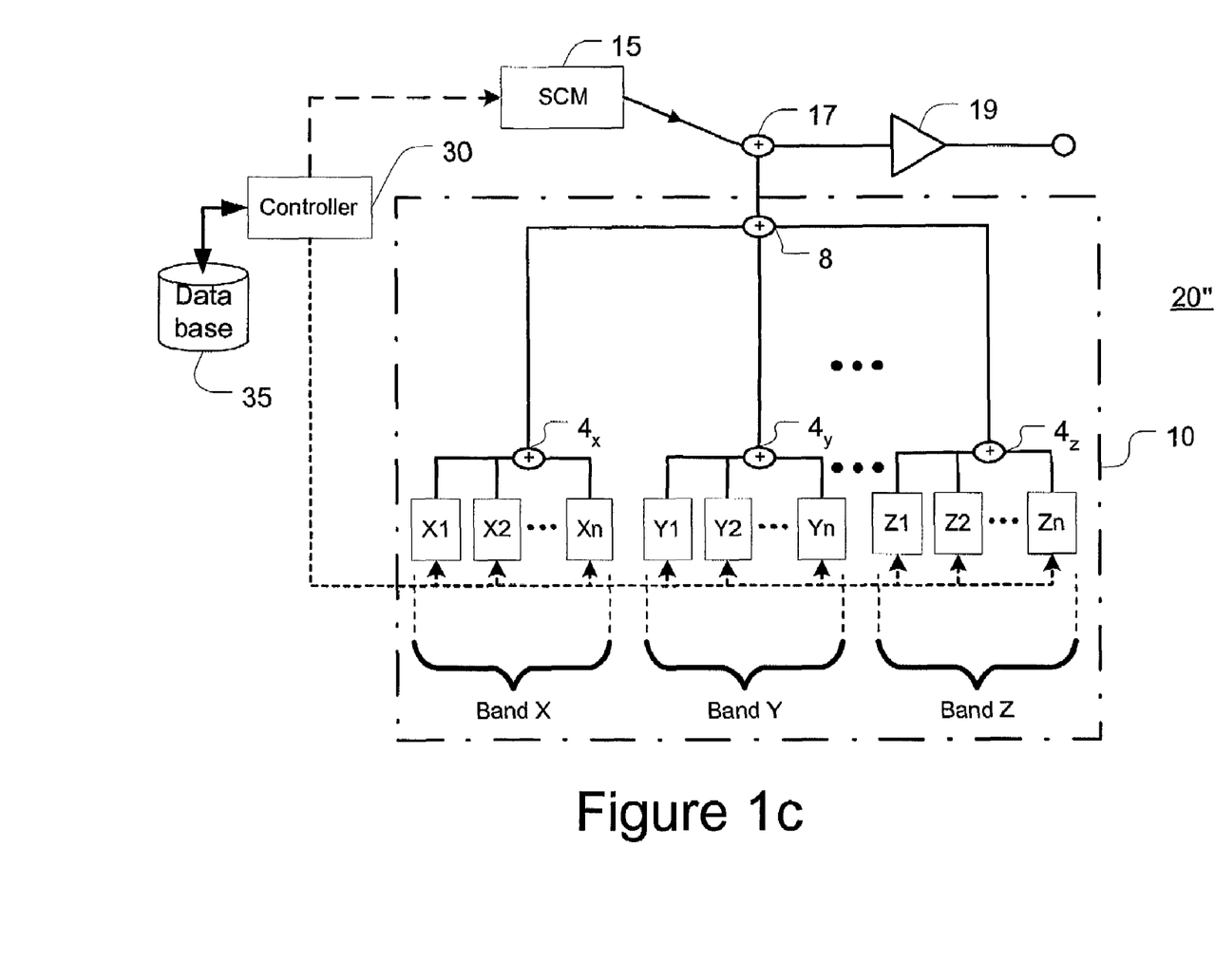
FIG. 1c is a block diagram of WDM transmitter node capable of imparting relative launch powers to bands of channels or individual channels according to an embodiment of the invention.

FIG. 1c shows another alternative transmitter 20" according to the invention. In this alternative, one or more of the transmitters X, Y and Z are commanded by controller 30 to output a desired output power level. The launch power settings may be used for this purpose to set the output power level of the transmitters X, Y, and Z. The control illustrated in FIG. 1c may be a per-channel-band control in which all channels in a particular band are controlled to have the same power or on a per channel basis where each channel power may be individually controlled.

The number of channels, number of bands, and number of channels per band shown in the figures is purely for illustration. Indeed, all of these numbers may be varied. For example, Bands X, Y and Z may have 1, 40, and 6 channels respectively and there may be a much larger number of bands than the three illustrated.

Figure 2:
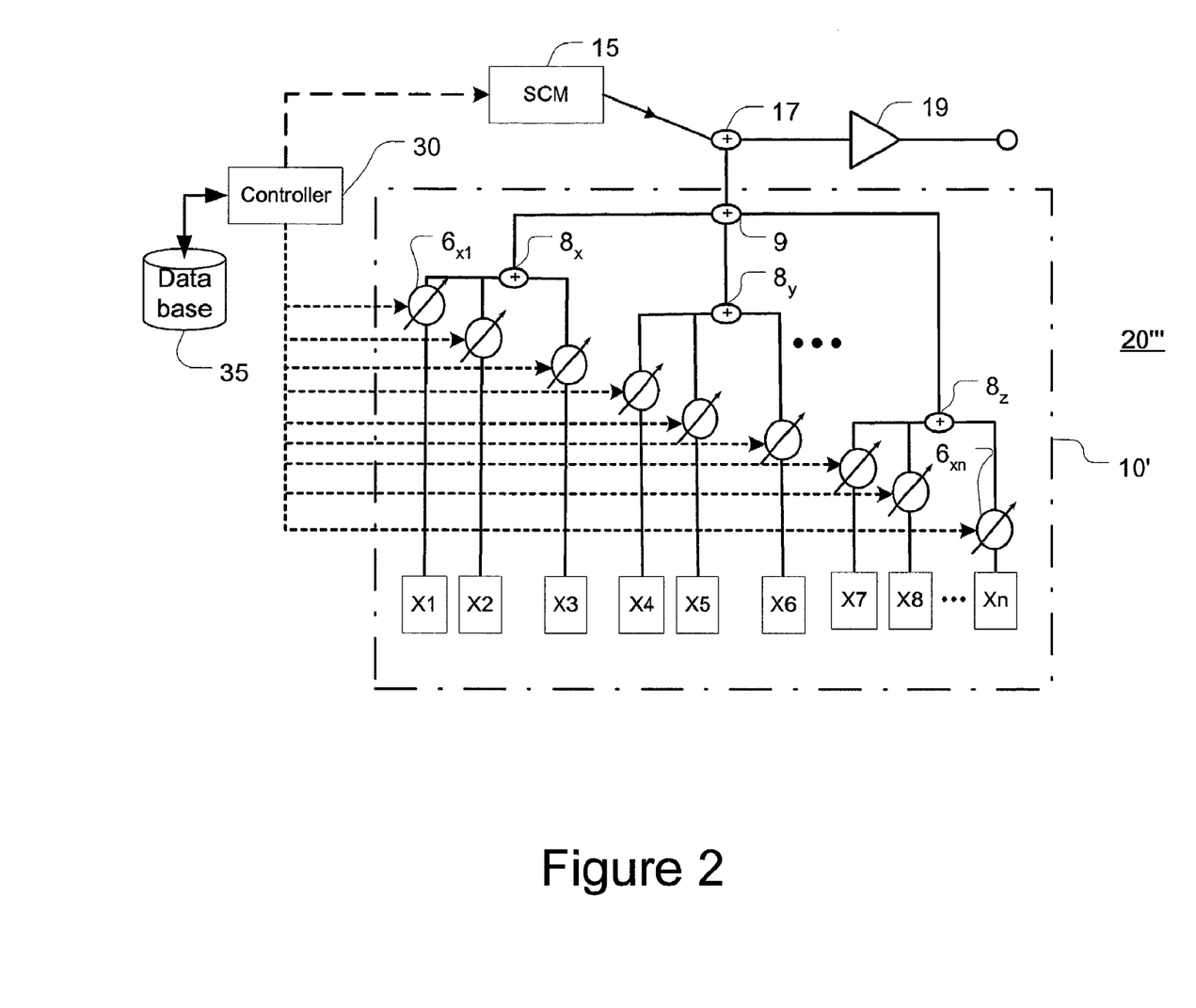
FIG. 2 is a block diagram of WDM transmitter node capable of imparting relative launch powers to individual channels according to another embodiment of the invention.

FIG. 2 illustrates an alternative WDM transmitter node 20' according to the invention. The WDM transmitter node 20''' in FIG. 2 shares many components and functionalities with the WDM transmitter node 20 in FIG. 1a. The main difference is that the node 20''' is capable of adjusting launch power on a per-channel basis as opposed to the per-band basis of node 20. As illustrated in FIG. 2, each channel (X1, X2, . . . Xn) has an associated VOA ($6_{x1}$, $6_{x2}$ . . . $6_{xn}$) so that each channel may be launched with a controllable power level. The VOAs ($6_{x1}$, $6_{x2}$ . . . $6_{xn}$) have their control inputs operatively connected to the controller 30 so that the controller 30 may adjust launch power using launch power settings for each channel.

It is also possible to construct a hybrid WDM transmitter node in which some of the channels are grouped into bands and power tuned using a VOA per band while some other channels are tuned separately with a VOA per channel. Other hybrids combining variations of VOA 6 tuning, fixed attenuator 7 tuning and transmitter power control tuning are also possible. A salient point for the inventive methods is that launch power at WDM aggregation point (i.e., combiner 17) can be determined by the controller 30. This determination could be via analysis of launch power and losses in transmission path, optical power measurement (OPM), calculation, provisioning or other techniques.

Figure 3:
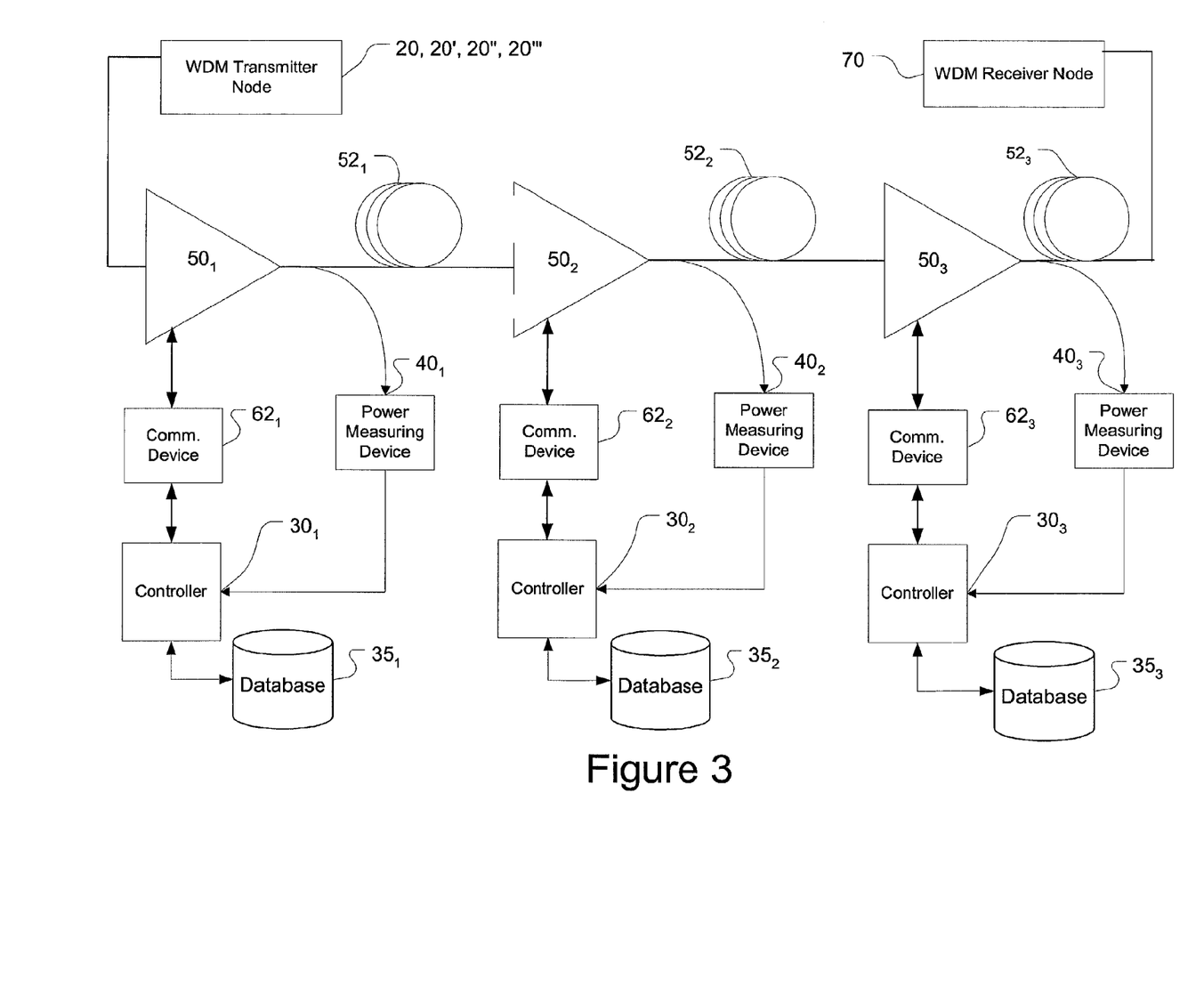
FIG. 3 is a block diagram of a portion of an optical communications network in an embodiment of the invention.

FIG. 3 is a block diagram of a portion of a WDM optical communications network in an embodiment of the invention. The optical communications network provides communications between WDM transmitter node (e.g. 20, 20', 20", 20''') and WDM receiver node 70. In an exemplary embodiment, the optical communications system is a WDM system in which the transmitter node (e.g. 20, 20', 20", 20''') generates a plurality of signals, each on a separate wavelength or channel. WDM receiver node 70 detects the individual channels as known in the art.

The WDM optical communications network includes a number of amplifiers $50_1$, $50_2$ and $50_3$ which may be implemented using EDFAs or other amplifier structures as discussed in relation to amplifier 19. The amplifiers 50 serve as signal regeneration points along sections of transmission fiber $52_1$, $52_2$, $52_3$. It is understood that other components may be included in the transmission span such as switches, couplers, etc.

Each amplifier $50_1$, $50_2$, $50_3$ is in communication with a respective communications device $62_1$, $62_2$, $62_3$ and an associated controller $30_1$, $30_2$, $30_3$. Controllers $30_1$, $30_2$, $30_3$ may have the same micro-processor based structure as controller 30 and execute a computer program to process and utilize the received coordinated channel power information as further discussed below in relation to FIGS. 7 and 8. Although it is preferred to shorten response times, it is understood that a one-to-one correspondence between amplifiers 50 and controllers 30 is not required. A controller 30 may interface with a plurality of amplifiers 50 or a single master controller may interface with all amplifiers.

The communications devices 62 may be implemented using a service channel modem (SCM) like the service channel model 15. Service channel modems may provide for communications between network elements as described in further detail in U.S. Pat. Nos. 6,163,392, 5,978,115 and 5,532,864, the entire contents of which are incorporated herein by reference. The controllers $30_1$, $30_2$, $30_3$ monitor transmission parameters at each amplifier $50_1$, $50_2$, $50_3$ and communicate with amplifiers $50_1$, $50_2$, $50_3$ and other controllers $30_1$, $30_2$, $30_3$ via communication devices $62_1$, $62_2$, $62_3$.

In an exemplary embodiment, the controllers 30 communicate over a service channel defined by one or more wavelengths (e.g., 1625 nm) carried on transmission fiber 52. The communications devices 62 use this wavelength to communicate without interfering with the signals carried on separate wavelengths. Alternatively, the controllers 30 may communicate over another communications network separate from transmission fiber 52.

Power measuring devices $40_1$, $40_2$, $40_3$ may be optically coupled to the output of respective amplifiers $50_1$, $50_2$, $50_3$. The power measuring devices 40 may be constructed from conventional elements such as a photo detector that detects a tapped portion of the amplified WDM signal as is known in the art. The signal output from the power measuring devices 40 is an electrical signal representative of the total amplifier output power and is supplied to the associated controller 30. Other power measuring devices and signal monitoring devices may also be included at various points in the network to provide a feedback signal for managing the system such as control and alarm triggering.

A database 35 is also operatively connected to the controllers. Preferably, a local database 35 is used for each controller 30 such that there is a one-to-one correspondence between the controllers $30_1$, $30_2$, $30_3$ and the databases $35_1$, $35_2$, $35_3$.

In operation, the controllers 30 may adjust the output power at each amplifier 50 as further described below. If the amplifier 50 is an EDFA the output power or gain may be controlled by adjusting one or more pump lasers supplying pumping light to the section of erbium doped fiber as is known in the art. In an exemplary embodiment, each database 35 stores topology information identifying the network elements in the transmission span and connections there between. Thus, each controller 30 knows its position in the communications network along with other transmission parameters such as the expected number of channels input and output at each amplifier, SNR at each amplifier, etc.

Figure 4:
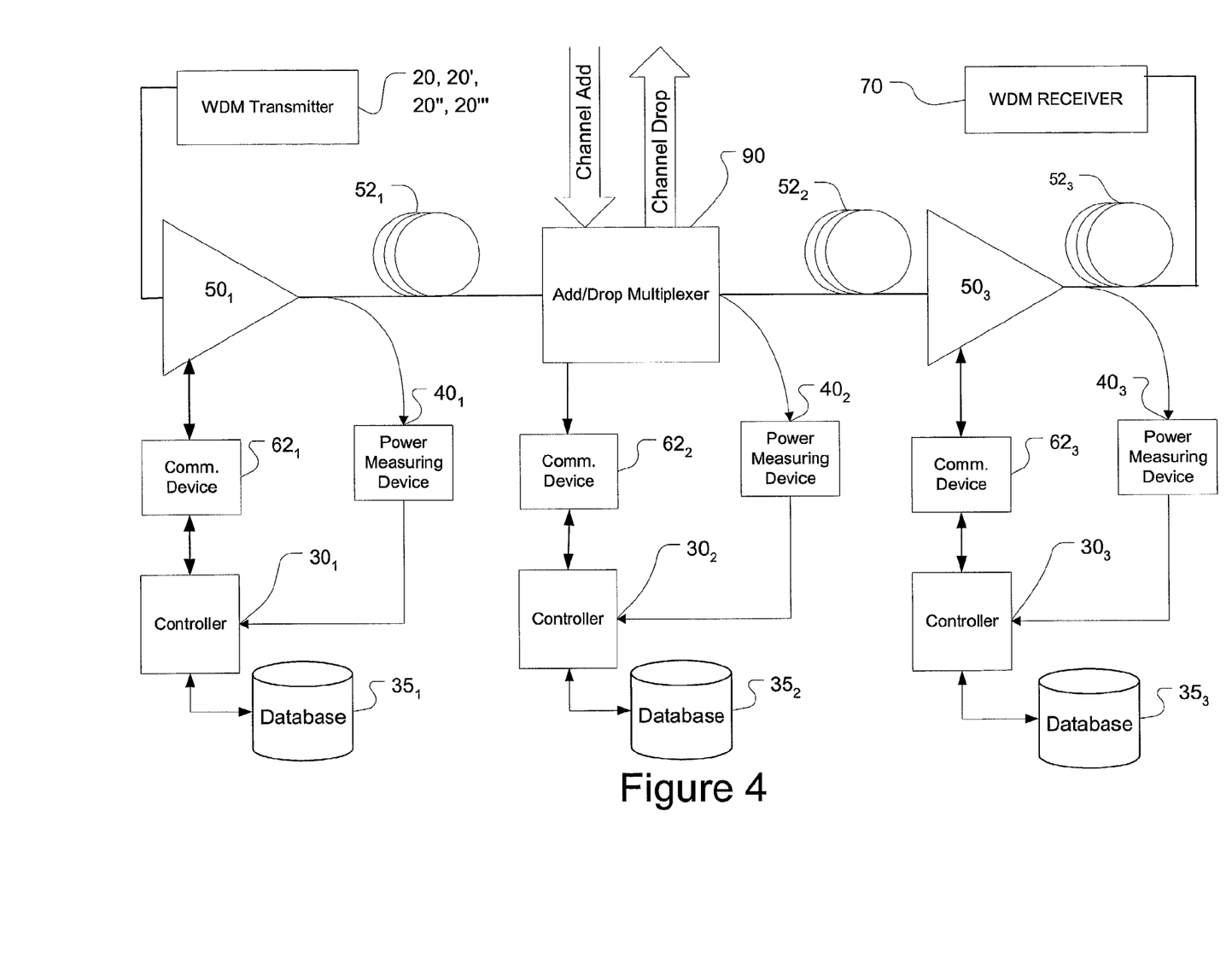
FIG. 4 is a block diagram of a portion of an optical communications network in an alternate embodiment of the invention.

Two exemplary embodiments of the inventive system are described herein. With reference to FIG. 3, in a first embodiment it is assumed that the number of channels transmitted along the transmission span does not vary. Thus, if 16 channels are sent by WDM transmitter node 20, the same 16 channels are received at WDM receiver 70. In the second embodiment described with reference to FIG. 4, an add/drop multiplexer 90 is positioned in the transmission span to provide the ability to add and/or drop channels. Such add/drop multiplexers are conventional elements in and of themselves and need not be discussed further herein.

Operation of Invention

In order to track and coordinate power through the system, the inventive algorithms should be able to allocate the power associated to each channel appropriately. Since 10 Gb/s channels, for example, may contain 4 times as much power as 2.5 Gb/s channels (in general), a weighted channel count is extremely beneficial for this purpose. Moreover, the channel format (e.g. whether error correction such as forward error correction) also has a bearing on the preferred channel weighting since different formats permit the channel to travel a much longer distance and still be recoverable and otherwise behave as if it were launched with an increased power.

One of the inventive concepts disclosed herein is coordinating channel power information across multiple network elements (NEs) and preferably across the entire span or network of spans. This coordination process begins in the WDM transmitter node 20, 20', 20", 20'" which determines channel weighting values and transmits the channel weighting values and other channel information to downstream NEs which, in turn, utilize this information to manage the downstream NE (e.g. effect amplifier control, OADM control, alarm triggering, etc).

Figure 6:
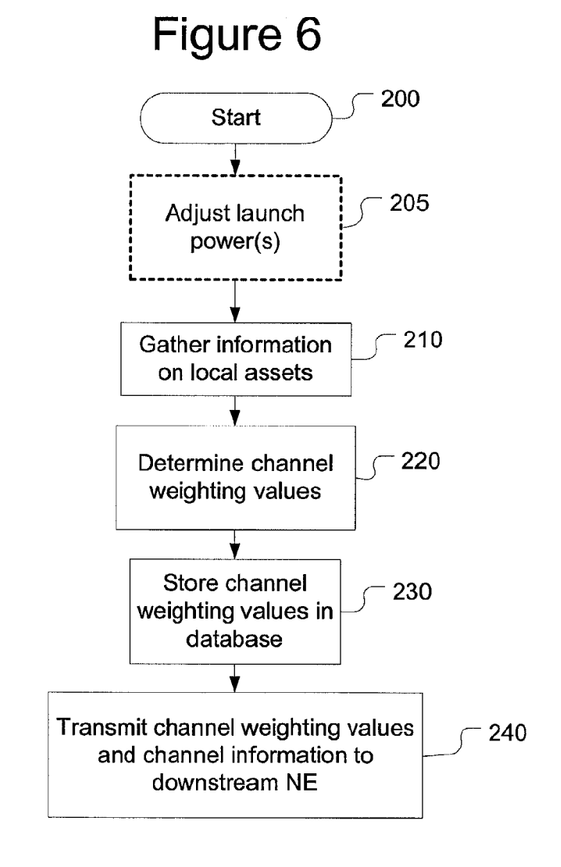
FIG. 6 is a flowchart of a method coordinating channel power information in a wavelength division multiplexed optical communications system.

FIG. 6 illustrates the channel power information coordination process. This process may be implemented in software and executed by controller 30 in the WDM transmitter node 20, 20', 20", 20'". As shown therein, the process begins with a start step 200 which may be an event-driven local notification that triggers or calls this process. The event-driven local notification which triggers start 200 may be a variety of conditions or states but typically occurs when a new channel is provisioned in the WDM transmitter node 20, 20', 20", 20'". Provisioning is a conventional process in which, for example, a channel card containing at least one of the transmitters and associated elements is plugged into the system and configured via a craft interface screen as is known in the art. In general, the existence of a new channel is an event-driven local notification and may occur through provisioning, enabling, turning on or otherwise.

Once triggered, the process continues as further shown in FIG. 6 by adjusting (205) the launch power(s) of the channels. This is accomplished by the controller 30 accessing the launch power settings in database 35 and controlling one or more of the VOAs 6 with these settings. Alternatively, the controller may send a command to the transmitters X, Y and/or Z as in the FIG. 1C embodiment to adjust the launch power(s). The adjusting (205) step may not be required (as indicated by the dotted lines representing step 205 in FIG. 6) particularly when there is no active channel adjusting element the launch path. The embodiment shown in FIG. 1b, where the launch path attenuation values are fixed, is an example of an implementation where the adjusting (205) step may be omitted.

The launch power settings used by the adjusting (205) step may include only the settings necessary command the VOAs 6 or transmitters X to adjust launch power. In general, however, a launch path power value is stored by database 35 which includes any launch power settings as well as fixed attenuation values on the launch path such as the insertion loss of combiners 4, 8 and 17 such that the total launch power per channel is known for the WDM signal. The launch power settings themselves may be determined in a variety of manners that are not dispositive here. In other words, the invention is concerned with coordination channel power information not with determining what the individual channel powers should be or how these power values are determined. Typically, however, the channel powers are provisioned, measured, and/or calibrated.

The inventive method proceeds by gathering (210) information on local assets. This gathering step 210 is performed by the controller 30 in WDM transmitter node 20, 20', 20", 20'" accessing the database 35 which stores information on local assets local to the WDM transmitter node 20, 20', 20", 20'" such as local equipment configuration (e.g. the location and existence of VOA(s) in the launch path); which channels are provisioned (or enabled, active, etc); channel information [data rate and signal format (e.g. FEC or non-FEC) for each provisioned channel]; and current launch power settings.

The process may then proceed by determining (220) channel weighting values for each channel present (e.g. provisioned) in the system. Channel weighting values may based on such factors as channel type, including data rate and format, equipment configuration, transmitter launch power, VOA settings, and other gain or loss elements in the signal launch path. In other words, the channel weighting determination (220) may account for variable as well as fixed or provisioned attenuation values present on the signal launch path. In general, where the launch path power values include such fixed or provisioned attenuation values and launch power settings, the channel weighting value is a function of the launch path power value for that channel, channel type, data rate, and equipment configuration.

As discussed in the prior patent application, a set of default channel weightings may also be defined based upon channel type, data rate and equipment configuration given fixed launch power at the transmitter. Adding a VOA such as VOA 6 into the signal path of this configuration would result in a channel weighting calculation as follows:

Weighting=DefaultWeighting*(10^(−VOA attenuation in dB/10))

For example, if the VOA launch power setting is 3.0 dB, then the channel weightings for all the channels going through that VOA is (assuming a default weighting=2 when VOA is 0 dB):

Weighting=2*(10^(-3/10))=2*0.5011872=1.0023

In an exemplary embodiment, the DefaultWeighting values are as follows: a signal having a transmission rate of 2.5 Gbps has a default weight channel value of 1 channel unit; a signal having a 10 Gbps transmission rate using forward error correction has a default channel weight value of 2 channel units; a signal having a 10 Gbps transmission rate without forward error correction has a default channel weighting value of 4 channel units. The presence of higher weighted channels will increase the power requirements of the amplifiers. Table A below depicts exemplary default channel weighting values and the associated channel power for different transmission rates and transmission formats. The variable x represents a power per channel unit value.

TABLE A

| Channel Number | Transmission Rate | Transmission Format | Default Channel Weighting | Channel Power |
|---|---|---|---|---|
| 1 | 2.5 Gbps | FEC | 1 | 1x |
| 2 | 10 Gbps | FEC | 2 | 2x |
| 3 | 10 Gbps | non-FEC | 4 | 4x |

After determining (220) the channel weighting values, the process then stores (230) the updated channel weighting values in database 35. For this purpose a variety of data structures and organizations may be used. It is preferred, however, that data objects are maintained by each of the local databases 30.

Figure 5:
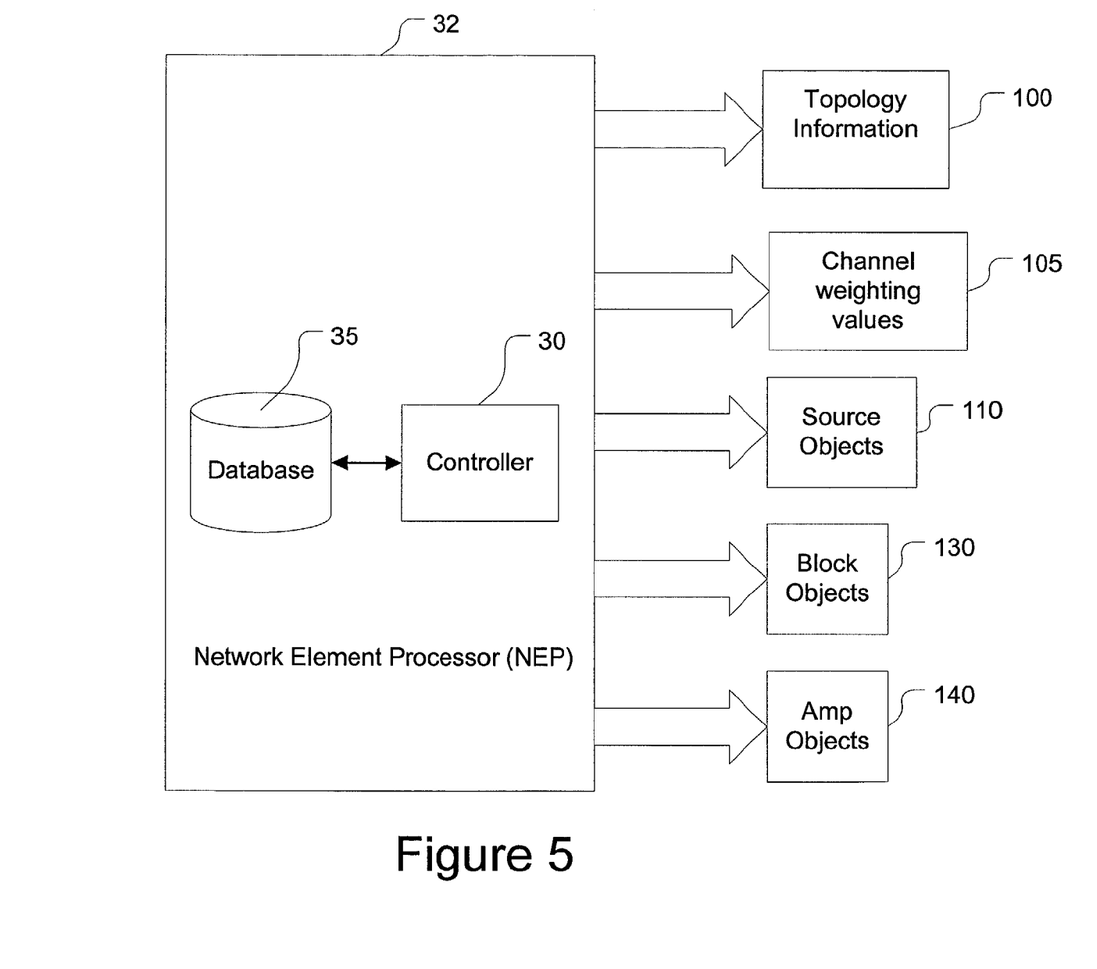
FIG. 5 is a dataflow diagram illustrating data object flow according to the invention.

FIG. 5 illustrates exemplary data objects that may be used to coordinate channel weighting information and manage network elements based on the coordinated channel weighting information. As shown therein, the controller 30 acting in conjunction with the database 35 creates various data objects and data items for transmission to downstream network elements. The controller 30 and database 35 are shown as part of a network element processor 32 which may include conventional elements such as communication devices and drivers necessary to transmit the objects and other information.

As shown in FIG. 5, the network element processor 32 may transmit topology information 100 to downstream network elements. The topology information 100 may include the information concerning the network elements of the network and the interconnections between the network elements. The topology information may also include the losses associated with optical elements along the channel route such as span loss (loss associated with the optical fiber connecting each NE). The topology information 100 may be provisioned or discovered through an automatic process. The network element processor 32 also sends the channel weighting values 105, determined as described above, to downstream network elements either separately or as part of the source objects 110 which are further discussed below. Other objects that may be generated and sent downstream include block objects 130 and amp objects 140 as also discussed below in more detail.

The purpose of the source object 110 is to provide information about DWDM sources along the span for a variety of management applications such as amp control, OADM control, and alarming functions. The source is a channel origination point within the span. Specifically, a source object 110 may be maintained by database 30 for each NE that injects a channel into the system such as the WDM transmitter node 20, 20', 20", 20"'.

The source object 110 may include the following data fields:

| FIELD NAME | DESCRIPTION |
|---|---|
| DIRECTION | Direction channel is traveling (e.g. 0 = Eastbound, 1 = Westbound) |
| NODE | IP Address of NE containing source |
| ID | Location within NE such as shelf, slot, port. |
| CHANNEL FREQUENCY | Wavelength of source |
| SIGNAL ENABLED | Indication of signal enabled (e.g. transmitter laser is on or off, modules in signal path disconnected, etc) |
| DATA RATE | Data Rate of channel |
| FORMAT | FEC/NON-FEC, etc |
| CHANNEL WEIGHTING | Channel weighting value |

Some of these fields are not strictly necessary to perform the inventive functionalities described here. The direction field, for example, is not necessary particularly if the WDM system is uni-directional. For ease of illustration and explanation, the invention is described as a uni-directional system but many systems launch channels bi-directionally (e.g. west and eastbound channels can flow through the system and in ring configurations clockwise and counterclockwise are often used as directional references).

The most important field in the source object 110 is the channel weighting field which may be used to store the channel weighting values determined in step 220. Since each source object 110 includes information about a single channel, the channel weighting field will store the weighting value for the associated channel. The source object 110 also stores channel information which may include the channel frequency, format and data rate information. Other channel information (direction, node, id, and signal enabled) may also be included in the source object 110.

The signal enabled field in the source object 110 is used by downstream network elements to determine whether the source should be counted or not (i.e., is its laser on) when managing the downstream network element based on channel weighting values. In other words, the source object 110 may be sent to downstream network elements upon provisioning the channel even though the laser in the transmitter generating the associated channel is not turned on. When the laser is activated, the Signal Enabled field can be used to indicate this fact and the source object 110 is updated and sent downstream. In this way, only those channel weights associated with channels that are actually being launched into the system factor into downstream network element management such as amplifier control, OADM control, and alarm threshold calculation as further discussed below.

The Direction and Node fields of source object 110 may be used to determine where the channel originates and in which direction it travels and may be used to determine whether the channel passes through a specific NE. The ID field is not necessary for implementation of the invention. The Channel Frequency or other channel identification information is used for discriminating between channels, associating sources with blocks, and providing detection of duplicate channels.

Once the channel weighting values are stored (230) in the database 35, the inventive process then transmits (240) the channel weighting values and channel information to a downstream NE. This may be accomplished by the controller 30 retrieving the source objects 110 (at least those that have changed in the last iteration of the FIG. 6 process) and sending the source objects 110 to the SCM 15 which converts the electrical signal representing the source objects 110 to an optical signal carried on the service channel. Alternatively, an electrical IP network could be used to transmit (240) this information. At a minimum, the information that needs to be sent downstream includes channel weighting information along with some kind of identifier that associates this information with the correct channel such as channel frequency (and direction if a bi-directional system).

Block objects 130 represent optical blocking mechanisms that allow DWDM channels to be terminated prior to the end of a span (i.e., drop at an OADM site). Typically, new DWDM channels are added in place of dropped channels (i.e., add at an OADM site). Block objects 130 are used by the invention to determine where channels terminate within a span such that each NE can determine the channels being input and output therefrom.

The block object 130 may include the following data fields:

| FIELD NAME | DESCRIPTION |
| --- | --- |
| DIRECTION | Direction channel is traveling (0 = Eastbound, 1 = Westbound) |
| NODE | IP Address of NE containing block |
| ID | Location within NE such as shelf, slot, port. |
| FREQUENCY | Wavelength of channel(s) being blocked |
| BLOCK TYPE | CHANNEL (e.g. grating), BAND (e.g. thin film filter) |

Many of these block object 130 fields are common to the source object 110 and need not be explained further. The frequency field identifies the frequency or frequencies that are blocked by the optical blocking mechanism. The block type may be used to discriminate between blocks that affect a single channel (aka a channel block which may be a grating such as a Bragg grating) or a band of channels (e.g. a thin film filter or other multichannel optical blocking device).

In general, the block object 130 should contain information sufficient to positively identify the channel(s) being blocked (e.g. the frequency or frequencies), direction (if a bi-directional system), and where it is blocked so that NEs may determine the number of channels input and output therefrom.

Block objects 130 are created for add-drop modules such as ADMs and OADMs and are updated by controller 30 associated with the ADM or OADM based on attribute change events on these or related modules. For example, the controller 30 may detect the presence of optical devices that block optical signals (e.g. gratings, thin film filters, etc) by referring to the database 35 which may include calibrated or provisioned information indicating which frequencies (a.k.a. channels) are blocked. Block objects 130 are sent downstream to other NEs to inform them of upstream channel blocks as well as maintained in database 35 associated with the current NE.

To further extend the data model to amplifier NE's, an amp object 140 may be utilized. Amp objects 140 represent amplifiers (e.g. amplifiers 501, 502, 503) that may be present at the NEs of a span and may include the following data fields:

| FIELD NAME | DESCRIPTION |
| --- | --- |
| SIGNAL STATE | Input/output signal state, amp health, etc |
| DIRECTION | Direction channel is traveling (0 = Eastbound, 1 = Westbound) |
| NODE | IP Address of NE containing block |
| ID | Location within NE such as shelf, slot, port. |

Amp objects 140 are created by the controller 30 in the associated NE when the amplifier module is provisioned. The Signal State field keeps track of the input signal state, output signal state, whether the amplifier 50 is operational and connected to the network, etc and generally informs downstream NEs as to general state of health for the amplifier 50. The amp objects 140 may be used by downstream NEs to determine which channels are present at each NE. If the amplifier 50 is not fully operational, as indicated by the Signal State field, then the WDM channels input thereto may be attenuated. For example, EDFAs become opaque to WDM channels when the pumping lasers fail such that none of the WDM channels make it past the EDFA. The amp object 140 may be used to track such an event and coordinate this information with downstream NEs. A Signal State field may be added to the source objects 110 and block objects 130 particularly if the associated NE relies on active elements the failure of which would cause a channel to not pass through the NE.

The amp object 140 also includes a Node field that may be used to ensure object receipt completeness. More specifically, the Node field identifies the optical amplifier's position on the network using, for example, an IP address. This identifier as well as the identifiers from the source objects 110 and block objects 130 may be correlated against the topology information to ensure that all expected objects have been received.

As an alternative to the source object 110, block object 130 and amp object 140 data structures may be used to keep track of the channel information and weighting values and transmit the data to downstream NEs. For example, the topology information 100 may be detailed enough to include the channel routing information for all of the channels including the source and any blocks for each channel as well as span loss between spans. The use of source object 110, block object 130 and amp object 140 data structures are preferred because they provide a convenient way to coordinate the various data across the network.

Figure 7:
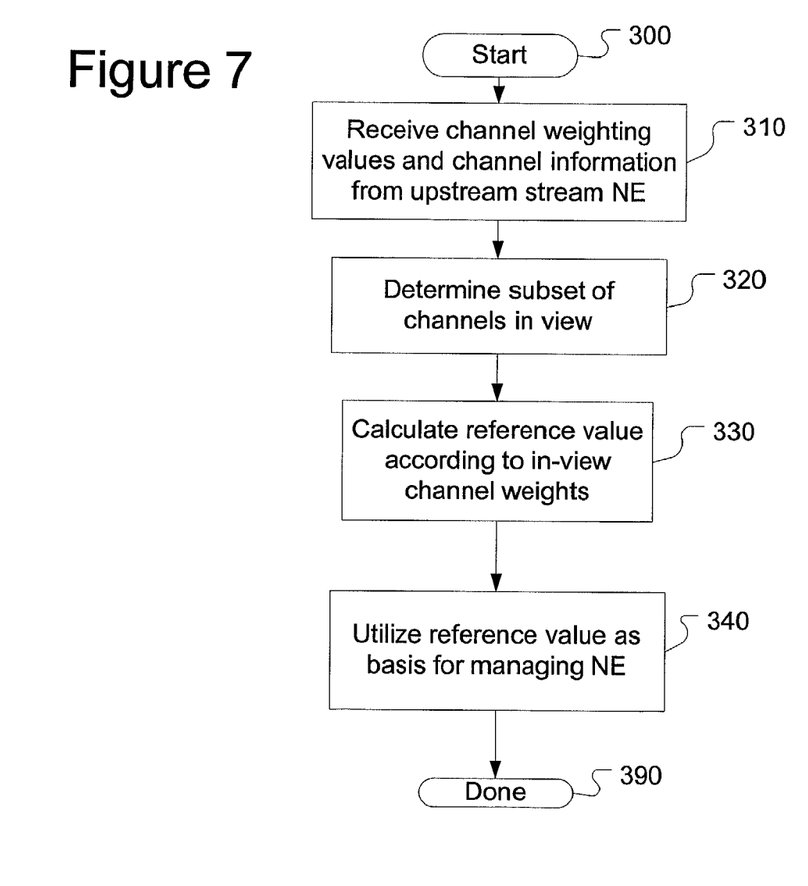
FIG. 7 is a flowchart of a method for using coordinated channel power information in a network element of a wavelength division multiplexed optical communications system.

FIG. 7 illustrates the general process performed by a NE downstream of the NE transmitting the channel weighting values and channel information either in the form of source objects 110 or otherwise. This process starts (300) is initiated by an event-driven local notification which may be the arrival of a source object 110 or other data structure containing a channel weighting value and channel information, the arrival of a block object 130 or other data structure containing channel blocking information, or the arrival of an amp object 140 or other data structure reporting on the presence and operational state of an upstream amplifier 50. The controller 30 receives (310) or otherwise inputs the channel weighting value(s) and channel information from an upstream NE.

If the object data structures are utilized (source object 110, block object 130 and amp object 140) and these objects include a Node field then the receiving step (310) may also use this information to ensure object receipt completeness. More specifically, the Node field identifies the position of the NEs on the network using, for example, an IP address. These NE identifiers may be correlated against the topology information to ensure that all expected objects have been received before proceeding.

The FIG. 7 process may then determine (320) which channels are being input/output to/from the NE. In other words, the process determines (320) which channels are "in view" or otherwise being optically processed by the NE. This may be done by examining all of the source objects 110, block objects 120, and amp objects 140. Based on identifying information such as node, direction and frequency the various channels may be correlated to determine which channels have been blocked by an upstream NE and which channels are arriving at the NE. In other words, enabled channels (as per the received source object(s) 110) that have not been blocked (as per the received block object(s) 130 and amp object(s) 140) are input to the NE. If the block object 140 for the current NE or other information indicates channels being dropped at the current NE (e.g. an OADM may drop channels and the block object 140 of the current NE may be used to represent the channel behavior of the OADM), the channels being output will differ from those being input to the current NE.

Once the process determines (320) determining the set of in-view channels that are passing through a point in the network element, then the channel weighting values associated with those in-view channels may be utilized (340) as a basis for managing the NE. In other words, only those channel weights corresponding to channels which are in-view at a particular management control point will be used to calculate (330) a reference value. This subset of channel weights is first determined (320) and then utilized to calculate (330) a reference value. The reference value may then be used as a basis for managing (340) the NE.

In the case of an amplifier NE all that really matters is the channels input thereto since all channels input will be also be output. Thus, in the case of an amplifier 50, it is only necessary to determine (320) which channels are being input to the amp and then use the channel weighting values associated with those identified channels to calculate (330) a reference value.

The reference value calculation (330) for amplifier management (340), for example, may simply be a sum of the channel weighting values for the channels being input to the amp as determined by the determining step (320). With the summed channel weighting values in hand, the process may then manage (340) the NE amp 50 according to the summed channel weighting values.

In general, management (340) of an amplifier 50 NE may utilize any equation based tuning algorithm that varies as a function of channel weights or in-view channel weights. In other words, the in-view channel weights or individual channel weights may be fed into an equation that calculates a reference value. The reference value may then be used as a basis for managing the NE. The actual equations and management process are largely immaterial with respect to the invention as long as they are based on or otherwise utilize the channel weighting values.

Another example of amplifier 50 control management (340) is ASE minimization. To minimize ASE according to the invention, the summed channel weights may be used. If the summed channel weights in a particular direction are all zero (indicating that no channel is present), then the amplifier 50 is controlled to have minimum gain (e.g. by controlling setting the pump(s) to a minimum level) thereby minimizing the ASE produced by that amplifier 50.

Furthermore, the NE management (340) is not limited to managing amplifiers. For example, the NE management (340) also applies to managing other types of NEs such as OADMs 90 and WDM receivers 70.

Still further the NE management (340) is not limited to actively controlling the NE. For example, the management (340) may include alarming functions or a combination of alarming and control functions. Alarming functions are many and varied but typically involve calculating an expected power level at various locations within the NE based upon knowledge of (a) which channels should be present or in-view at that location as identified by the determining (320) step, (b) calculated or measured upstream launch powers (in the invention channel weighting values are used for this purpose), and (c) gain/loss within the system (as tracked by the topology information). The expected power level may be used as an alarm threshold to manage (340) the NE. The management (340) may also involve control triggered by the raising of an alarm.

The processes illustrated in FIGS. 6 and 7 and described above may be implemented by a microprocessor-based controller 30 in the NE. Thus, the invention may be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Also included may be embodiments in the form of computer program code, for example, whether stored in a storage medium, loaded into and/or executed by a computer, or as a data signal transmitted, whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. A method for coordinating channel power information in a wavelength division multiplexed optical communications system having at least a first and a second network element, the method comprising:

gathering information on local communications assets local to the first network element including launch path power values and channel information of the plurality of wavelength division multiplexed channels output from the first network element;

determining channel weighting values for the plurality of wavelength division multiplexed channels output from the first network element based on the launch path power values and the channel information, wherein at least one of said plurality of channel weighting values is different from the remainder of said plurality of channel weighting values, and wherein the channel weighting value for each of the plurality of wavelength division multiplexed channels is set to a default value responsive to the channel rate and if forward error correction is included, and thereafter the channel weighting value is modified responsive to variable optical attenuator settings;

storing the launch path power values, the channel weighting values, and the channel information in a database operatively connected to the first network element; and transmitting the channel weighting values from the first network element to the second network element, and said gathering step accessing the database to gather information on local communications assets local to the first network element.

2. The method for coordinating channel power information according to claim 1,
wherein the channel information includes channel format and data rate information for the channels,
said transmitting step transmitting the channel weighting values and channel information from the first network element to the second network element.

3. The method for coordinating channel power information according to claim 1,
wherein the channel information includes channel frequency, channel format and data rate information for the channels,
said transmitting step transmitting the channel weighting values and channel information from the first network element to the second network element.

4. The method for coordinating channel power information according to claim 1, wherein the first network element is capable of injecting at least one channel into the network, the method further comprising:
controlling the launch power of the at least one injected channel according to the launch path power values.

5. The method for coordinating channel power information according to claim 4,
wherein the WDM channels are divided into bands of channels such that all channels in particular band have substantially the same launch path power value;
said controlling step being performed on a per-channel-band basis.

6. The method for coordinating channel power information according to claim 4,
said controlling step including adjusting a variable optical attenuator in the launch path of the at least one channel according to the launch power settings.

7. The method for coordinating channel power information according to claim 4,
said controlling including adjusting an output power of a transmitter transmitting the at least one channel according to the launch power settings.

8. The method for coordinating channel power information according to claim 1, wherein the wavelength division multiplexed optical communications system has a plurality of network elements including the first and second network elements, the method further comprising:
transmitting network topology information to the network elements including channel source and channel block information for each of the channels and connectivity between the network elements.

9. The method for coordinating channel power information according to claim 1, wherein the channel weighting values represent a channel power value normalized by a reference channel power value.

10. The method for coordinating channel power information according to claim 9, wherein the reference channel power value is the amount of power typically used for a 2.5 Gbps WDM channel.

11. A method for using coordinated channel power information in a network element of a wavelength division multiplexed optical communications system carrying a plurality of channels, the method comprising:
receiving a plurality of channel weighting values and channel information for wavelength division multiplexed channels generated upstream of the network element wherein at least one of said plurality of channel weighting values is different from the remainder of said plurality of channel weighting values, and wherein the channel weighting value for each of the plurality of channels is set to a default value responsive to the channel rate and if forward error correction is included, and thereafter the channel weighting value is modified responsive to variable optical attenuator settings;
storing the channel weighting values and the channel information in a database operatively connected to the network element;
determining a set of in-view channels that are passing through a point in the network element based on the channel information;
calculating a reference value according to channel weighting values corresponding to the set of in-view channels; and
utilizing the reference value as a basis for managing at least a portion of the network element corresponding to the point though which the in-view channels pass.

12. The method for using coordinated channel power information in a network element according to claim 11, wherein the channel information includes frequency information identifying the channels generated upstream of the network element,
said receiving step also receiving upstream topology information concerning upstream network elements upstream of the network element; and
said determining step determining the set of in-view channels that are passing through a point in the network element based on the channel information and the upstream topology information.

13. The method for using coordinated channel power information in a network element according to claim 11,
said receiving step including receiving source objects, wherein each of the source objects includes the channel weighting value and frequency of one of the channels generated upstream of the network element.

14. The method for using coordinated channel power information in a network element according to claim 11, said receiving step including:
receiving source objects, wherein the source objects include the channel weighting values and frequencies of the channels generated upstream of the network element; and
receiving at least one block object, wherein the at least one block object includes a frequency of a blocked channel blocked upstream of the network element.

15. The method for using coordinated channel power information in a network element according to claim 14,
said determining a set of in-view channels step correlating the source objects and the at least one block object to determine which channels are passing through a point in the network element.

16. The method for using coordinated channel power information in a network element according to claim 11, said receiving step including:

receiving source objects, wherein each of the source objects includes the channel weighting value and frequency of one of the channels generated upstream of the network element;

receiving at least one amp object, wherein each of the at least one amp objects includes information identifying an upstream optical amplifier;

receiving upstream topology information specifying upstream network topology upstream of the network element; and determining object receipt completeness by correlating the source objects, the at least one amp object and the upstream topology information.

17. The method for using coordinated channel power information in a network element according to claim 11, wherein the channel information includes information on whether channels are enabled or not;

said determining step determining the set of in-view, enabled channels that are passing through a point in the network element based on the channel information.

18. The method for using coordinated channel power information in a network element according to claim 11, said utilizing step triggering an alarm condition based on the reference value.

19. The method for using coordinated channel power information in a network element according to claim 11, said utilizing step controlling at least a portion of the network element corresponding to the point through which the in-view channels pass based on the reference value.

20. The method for using coordinated channel power information in a network element according to claim 11, wherein the network element includes an optical amplifier, the method further comprising:

said determining step determining a set of in-view channels that are passing through the optical amplifier based on the channel information;

said calculating step summing the channel weighting values corresponding to the set of in-view channels;

said utilizing step controlling amplifier gain based to the summed channel weight values.

\* \* \* \* \*